United States Patent Office 3,549,372

Patented Dec. 22, 1970

3,549,372

LITHOGRAPHIC PRINTING SURFACE

Isadore M. Richlin and Elmer S. Bornemisza, San Gabriel, Calif., assignors, by mesne assignments, to Lithoplate, Inc., Philadelphia, Pa., a corporation of Illinois No Drawing. Filed Jan. 13, 1966, Ser. No. 520,350
Int. Cl. G03f *7/02;* C23c *1/10;* B41n *1/08*
U.S. Cl. 96—67 15 Claims This invention relates generally as indicated to a lithographic printing surface and more particularly to a lithographic plate base having a novel intermediate or barrier layer thereon.

In the preparation of lithographic plates, a light-sensitive coating is provided on the surface of a support member which is subsequently exposed to light through a transparency, stencil, negative or the like. The selected areas of the light-sensitive coating so exposed undergo a reaction thus providing a surface having a differential solubility in the light-exposed and unexposed areas. The plate may then be developed with a suitable solvent to remove the undesired areas and thus form the desired image on the surface.

To be acceptable commercially, lithographic plates must be capable of producing many thousands of impressions. In prior plates, the hydrophilic areas provided by the bare metal of the plate tended to lose their water-attractiveness after a period of time. When this occurs, the plate begins to pick up ink in these areas so that "scumming" of the plate results, and accordingly copies printed from the plate are of unacceptable quality.

In an effort to minimize scumming and thus lengthen the useful life of the plate, various materials have been used as a hydrophilic intermediate or barrier layer between the support member and the light-sensitive coating. To be an acceptable barrier layer, such material must, of course, be hydrophilic and incapable of undergoing a harmful reaction with the light-sensitive material. A suitable sublayer must also be capable of receiving and retaining the light-sensitive material prior to exposure and development and of releasing certain areas of the light-sensitive coating after light exposure while firmly retaining such material in other areas.

With the diazo light-sensitive materials, there is also the additional objection that many such compounds react chemically with the metal surfaced plates with which they are normally used. Consequently, whenever a diazo material is used as the light-sensitive coating, it is necessary to include a hydrophilic sublayer which completely and effectively seals the metal surface from the diazo material and accordingly prevents chemical reaction therebetween.

In recent years, the use of various diazo materials as the light-sensitive coating has become quite popular, because a completely "presensitized plate" may be prepared which can be stored in light-excluding packages for several months prior to use. At that time, the plate is simply converted to the desired printing plate by exposure to a light source in the typical fashion and thereafter developed to form the desired image. To enhance the quality and to improve the storage life of such plates, it is extremely important that a sublayer having the indicated characteristics be provided between the plate base and light-sensitive coating to preclude deterioration or decomposition of the diazo material through contact and reaction with the metal surface.

Another common practice which is presently used quite extensively is to prepare a plate having the desired hydrophilic sublayer thereon but without the overlying light-sensitive coating. Plates of this type are purchased by printers and are used whenever necessary by merely wiping on a solution of light-sensitive material, and after drying, the plate is then ready for light exposure. Accordingly, such plates have become known in the art as "wipe-on plates." Since the hydrophilic layer is exposed to the atmosphere in plates of this type and is not protected by an overlying layer of light-sensitive material, as in the case of presensitized plates, certain of the sublayers which have been previously provided have been found to deteriorate after a period of time and lose their hydrophilic character.

It is a principal object of the present invention therefore to provide a lithographic printing surface which includes a novel barrier layer.

It is another object of this invention to provide a lithographic plate with an intermediate or barrier layer which will provide a complete and effective seal for a metal surfaced plate from a light-sensitized diazo compound.

Yet another object of this invention is the provision of a lithographic plate in which the intermediate layer is the reaction product of a hydroxylated surface and a metal chelate ester.

Other objects, features and advantages of this invention will become apparent to those skilled in the art after a reading of the following more detailed description.

To the accomplishment of the foregoing and related ends, the invention, then, comprises the features hereinafter fully described and particularly pointed out in the claims, the following description setting forth in detail certain illustrative embodiments of the invention, these being indicative, however, of but a few of the various ways in which the principle of the invention may be employed.

These and other objects are achieved by means of this invention in which a lithographic printing surface is provided which comprises a support member having a hydroxylated surface, a light-sensitive coating and an intermediate hydrophilic barrier layer which is the reaction product of the hydroxylated surface and a metal chelate ester of a Group IV*b* metal and an alcoholic compound which may be a glycol or an alkanol amine. As will be seen from the working examples and description which follow, such printing surfaces may be prepared by a relatively simple process and are capable of being used in standard lithographic processes for the production of many copies without loss of reproducibility in the image areas.

The support or backing member for the lithographic surface may, in general, be any of the standard metal or metal surfaced plates which are commonly used in lithographic printing so long as it has a substantially uniform surface on at least one side to which the sublayer of this invention may be applied and firmly retained. Aluminum and zinc are generally the preferred metals. The support member may also, in certain cases as will be explained, be a coated paper such as that used in the manufacture of direct image plates or photosensitive plates. Illustrative examples of such materials include paper or other sheet stock coated with an aliginate, casein, carboxy methyl cellulose or the like. Also, as per the standard technique, the paper sheet may be impregnated with a thermosetting resin such as phenol formaldehyde.

In the present invention, to insure that the sublayer is securely attached to the support member, it is necessary that the surface be "hydroxylated" prior to application of the chelate ester to provide reactive hydroxyl groups on the surface for reaction with the ester. Hydroxylation of metal surfaces may be produced by treatment of the surface with various agents, such as for example, sodium hydroxide, potassium hydroxide or ammonium hydroxide, as will be more completely described. Although the exact chemical mechanism which occurs on the surfaces of metals, such as aluminum, is not completely known, it has been postulated that a hydroxide is formed as for example aluminum hydroxide. It has also been postulated, however, that the metal first becomes oxidized and the oxide in turn becomes hydrated. Irrespective of the mechanism involved, it is to be understood that the addition of hydroxyl groups to a metal surface is to be defined by the term "hydroxylation" as used herein.

Such hydroxylation may be produced by treatment of a metal surface with only slightly basic solutions of relatively strong inorganic bases such as those mentioned above. When using an alkali metal base, relatively dilute aqueous solutions of approximately 0.05 to about 3.0 percent by weight should be used to treat the metal as desired but not to dissolve it. Similarly, because of the strength of such bases, treatment of the metal surface is preferably carried out at room temperature. To hydroxylate a metal surface with such an agent, it is necessary only to immerse the surface into the aqueous basic solution for approximately 1 to 3 minutes, after which the surface is removed and dried. Stronger solutions may also be used, of course, if desired but the treatment time will be correspondingly less. In the case of ammonium hydroxide, the concentrations are generally approximately the same, but the treatment time is normally somewhat longer, as for example from about 5 to about 12 minutes, and the temperature is somewhat higher as, for example, from about 50 to 100° C.

Hydroxylation of a metal surface may also be produced by treatment with various amino-hydroxy compounds such as ethanolamine, diethanolamine and triethanolamine. These materials are also used as aqueous solutions and the treatment temperature is also from about 50° C. to about 100° C. The treatment time ranges from approximately 3 to about 10 minutes, and the aqueous solution may contain from about 1 to about 10 percent by weight of the amino-hydroxy compounds.

Boiling water may be used as the hydroxylating agent for metal surfaces and the plate will be immersed in it for from about 5 to about 15 minutes. Strong oxidizers in the presence of water can also serve as suitable hydroxylating agents, such as hydrogen peroxide, potassium permanganate, chromic acid and the like. A solution comprising sodium fluoride, sodium aluminate, and sodium hydroxide, as disclosed in U.S. Pat. 2,811,426 may be used in combination with an oxidizing agent such as nitric acid, chromic acid, etc. to hydroxylate metal surfaces, particularly aluminum.

Another very suitable way in which the surface of the support may be hydroxylated is by application of a coating of a hydroxyl containing water dispersible amino formaldehyde resin which may be a urea formaldehyde or melamine formaldehyde resin onto the surface. One such material and the process of producing it are described generally in U.S. Pat. 2,616,874, and accordingly reference may be made to this patent for a more complete description. In general, such material is in the nature of polyethylene amine compound which has been reacted with urea to give a ureido substituted polyethylene amine which is then reacted with formaldehyde to substitute methylol groups for the hydrogen atoms of the amine groups, thus providing numerous hydroxyl groups on the surface of the support to which the subsequently applied chelate esters may bond.

It will thus be appreciated that when the "hydroxylated surface" is formed by application of a coating of a hydroxyl containing amino formaldehyde resin to the support surface, the support need not have a metal surface but may be any of those commonly used in lithogrophic processes, such as those previously mentioned. The water-dispersible resin is preferably applied to a clean surface of the support member in an aqueous dispersion after which the excess resin may be rinsed off with running water. In the preferred process, the resin is applied as an aqueous dispersion containing from about 0.1 to about 20.0 percent by weight of the resin, and the support member is treated with this solution for preferably from about 10 seconds to about 5 minutes. The temperature of the dispersion is lower than the boiling point of water and is preferably applied at room temperature, although higher temperatures may be used, up to about 185° F.

The chelate esters suitable for use in this invention are derived from metals of Group IV*b* of the Mendeleev Periodic Table and alcoholic compounds which may be either alkanol amines or glycols. Illustrative examples of such metal chelates include various glycolates such as titanium or zirconium ethylene glycolates, propylene glycolates, and octylene glycolates (2-ethyl-1,3 hexanediol). Other glycols may also be used for formation of the chelate, and these include 1,3-butanediol, 2,3-butanediol, 2-methyl-2,4-pentanediol, diethylene glycol, triethylene glycol, tetraethylene glycol and dipropylene glycol.

Numerous alkanol amines are suitable for formation of the metal chelates, including ethanolamine, diethanolamine, triethanolamine, methylethanolamine, methyldiethanolamine, dimethylethanolamine, diethylanolamine, butylethanolamine, dibutylethanolamine, isopropanolamine, diisopropanolamine, triisopropanolamine, diisopropylethanolamine, aminoethylethanolamine, ethyldiethanolamine, phenylethanolamine, phenyldiethanolamine, and phenylethylethanolamine. Other alkanol amines suitable for use include those produced by reduction of the corresponding nitrol alcohol, such as 2-amino-1-butanol, 2-amino-2-methyl-1-propanol, 2-amino-2-methyl-1,3-propanediol, 2-amino-2-ethyl-1,3-propanediol and 2-amino-2-(hydroxymethyl)-1,3 propanediol.

As mentioned, suitable metals for forming the chelate complexes are the Group IV*b* metals, and these, of course, include titanium, zirconium, hafnium and thorium. Titanium and zirconium are generally the preferred metals, and titanium and zirconium chelates of octylene glycol and triethanolamine are, in general, the preferred metal chelates.

The chemical structure of the metal chelates is not completely known, but it is believed that the metal complexes have chelate ring structures which involve a coordinate bond between an oxygen or nitrogen atom, as the case may be depending upon whether a glycol or amine is used, which is capable of donating electrons to the metal. The structure of such complexes may be generally as follows:

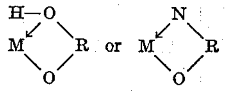

wherein M is the metal and R is the glycol or alkanol amine residue.

The number of chelate rings which will be present, of course, depends upon the coordination number and valance of the particular metal and also upon the mole ratio of chelating compound, i.e., glycol or alkanol amine, to metal which is employed. For example, in the formation of triethanolamine titanate from tetraisopropyl titanate, if stoichiometric quantities are used (about 2 moles of triethanolamine to titanium), the structure of such material is believed to be generally as follows:

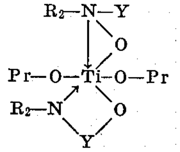

wherein Pr is the isopropyl group and Y represents a portion of the triethanolamine molecule. If, however, additional moles of chelating compound are used, the additional moles are believed to merely replace the two remaining alkoxy groups and thus yield a titanium compound having four cyclic or chelate rings. Consequently, it is to be understood that such metal complexes, regardless of the chemical structure, are to be within the scope of the present invention.

The solution medium for application of the chelate esters will vary depending upon the particular chelate used. For example, if the chelate is soluble in water, as in the case of the alkanol amines and most of the glycols, the ester may be applied to the metal surface as an aqueous solution. If, however, the metal complexes are insoluble in water, as for example octylene glycol titanates, the metal chelate will be applied as a solution in an organic solvent such as, for example, isopropanol, n-butanol, cyclohexane, benzene, chlorobenzene, dimethyl formamide, p-dioxane, diethyl acetate, nitrobenzene, etc.

The concentration of the solution of chelate ester may be varied, but will normally be in the range of from about 0.1 to about 10.0 percent by weight of the chelate ester. The preferred range is from about 0.5 to approximately 5.0 percent by weight. The mode of application of the chelate ester solution may be by any of the standard techniques, such as roller coating, whirler coating, dipping, etc. The solution should generally remain in contact with the plate for approximately 5 seconds to about 10 minutes, and will normally be applied at room temperature although higher temperatures may be used, as for example up to about 185° F. The time and temperature will, of course, vary with the particular chelate ester and concentration of the solution.

After application of the metal chelate solution to the hydroxylated support, the plate is preferably dried to drive off the solvent and dry down any excess solution which may have been left on the surface in order to avoid accumulating powdery titanium, zirconium etc. oxide either on the surface of the plate or in the hydrolysis bath of the subsequent hydrolysis step. If desired, heat may be used to facilitate drying, for example, by heating to about 150° C. to about 180° C. for from about 4 to about 7 minutes. Alternatively, excess solution may be removed by spray rinsing, although heating is generally the preferred method.

When the metal chelate ester is applied to the hydroxylated surface, there is a chemical reaction upon hydrolysis, at least at the interface, between the hydroxyl groups on the surface and the chelate ester to provide a sublayer which is tightly bonded to the metal support member. The nature of this chemical reaction is not completely understood, but it is believed that the reaction product is in the nature of, for example, a titanate or zirconate when these particular metal chelates are used, with the chelate being bonded to the surface of the support through an oxygen atom.

After the metal chelate has been applied and the excess removed, the plate is subjected to a hydrolysis treatment. In general, the chelate esters which have been described are hydrolyzable at moderately elevated temperatures, and consequently the hydrolysis may in general be conducted at temperatures on the order of about 75° C. or higher. With certain of the metal complexes, however, as for example octylene glycol titanate, which hydrolyzes to a limited extent at room temperature (the hydrolysis does not, however, proceed to the point where precipitation of the titanium occurs), the hydrolysis may be carried out at substantially lower temperatures. If desired, hydrolysis may also be conducted by the use of steam or boiling water.

The time necessary for hydrolysis to occur will, of course, vary with the particular temperature used, but in general the contact time will be from approximately 1 minute to about 10 minutes. Hydrolysis is necessary for the production of a sublayer which is sufficiently hydrophilic to be suitable for use as a subbase, since the hydrolysis is believed to break open the ring structure of the chelate and perhaps to cause the chelate to polymerize to thus provide water-loving groups on the surface.

After hydrolysis, the plate may be stored for later use or alternatively used immediately by applying thereto a coating of a light-sensitive material. The light-sensitive material which may be used in this invention may be any of the usual material including diazo compounds, bichromated casein, bichromated albumin, gelatin, etc. Other light-sensitive materials may also be used, including halogenated polyvinyl alcohol in aqueous dispersions or solutions as described in U.S. Pats. 2,179,245; 2,199,865 and 2,342,175. Dispersions or solutions of protein such as casein described in U.S. Pats. 2,324,197; 2,324,198 and 2,500,453 may also be used, as well as the ferric iron light-sensitive systems described in Adams and Sorkin Pat. 3,169,065. All of these materials are capable of reacting with light and particularly ultraviolet light such as through a transparency to form a lithographic printing plate.

Referring to the diazo materials which have been found to be suitable light-sensitive materials, numerous such light-sensitive diazo materials may be used. One particularly suitable material is the condsensation product of paraformaldehyde with p-diazo diphenyl amine sulfate described in U.S. Pats. 2,679,498 and 2,100,063. Additional examples of suitable such diazo compounds are described in U.S. Pats. 2,063,631; 2,667,415; 2,692,827; 2,714,066; 2,773,779; 2,778,735; 2,958,599 and 3,030,210.

The dispersion or solution of the sensitizer or light-sensitive material may be applied to the prepared base by dipping, spraying, roller coating, brushing or other conventional means.

The plate may be exposed to any standard source of actinic light, preferably ultraviolet light, and the exposure time will generally be equivalent to about 10 to 100 lux units at 3,000 foot candles, although the time and exposure may vary. A luxometer (lux) is a common analytical unit for measuring cumulative quantities of light in terms of intensity time units and as used herein is equal to 13,000 foot candles seconds of illumination, wherein the intensity of light is at least 2,000 foot candles supplied by a white flame carbon arc source.

The invention will be better understood by reference to the following specific but non-limiting examples.

EXAMPLE I

An aluminum sheet of the standard type used to prepare lithographic plates was cleaned of surface grease and other contaminants by immersion for about 2 minutes in an aqueous solution of trisodium phosphate at about 160° F. The plate was thereafter washed for about 2 minutes with tap water and was subsequently immersed for another two minutes in a desmutting bath consisting of a mixture of 2 percent chromic acid, and 0.8 percent sulfuric acid.

Following the acid bath, the plate was again rinsed in water and immersed into an 0.55 percent aqueous solution at room temperature of ureaformaldehyde resin of the type previously described which was purchased commercially under the "Uformite" trademark. The plate remained in the solution for approximately 2 minutes.

After application of the ureaformaldehyde coating, the plate was washed and dried by infrared heat. The plate was thereafter dipped into a 1 percent by weight solution of titanium octylene glycolate, commercially available from the E. I. du Pont de Nemours and Company under the trade designation "OGT," in isopropanol, after which the plate was again dried by infrared heat and washed with tap water at a temperature of about 80° C. to hydrolyze the chelate ester and provide the hydrophilic sublayer.

After hydrolysis, the plate was sensitized with an 0.5 percent by weight solution of Fairmount Chemical Co.'s Diazo Resin #4. The plate was subsequently dried and and exposed through a negative transparency for 80 lux units to an ultraviolet light source.

After exposure, the plate was desensitized with Harris 125 desensitizing solution and lacquered with Harris 201 BlackLacquer to remove the non-light exposed diazo surface and to provide printing and non-printing areas on the surface of the plate. The plate of this example was subsequently used in a lithographic press for normal printing operations, and was found to be a very clean running plate, yielding copies of good quality in both the image and background areas.

EXAMPLE II

The procedure of Example I was followed in which an aluminum plate was cleaned with trisodium phosphate, desmutted in the chromic and sulfuric acid bath, and hydroxylated with the ureaformaldehyde resin, but the metal chelate ester was a 1 percent by weight solution of zirconium octylene glycolate in isopropanol. After application of the metal chelate ester to the hydroxylated surface, the plate was dried, washed with tap water, and subjected to hydrolysis at about 80° C.

After hydrolysis, the plate was sensitized and exposed as in the preceding example. The plate produced by this run was subsequently press tested and was found to produce impressions of satisfactory quality.

EXAMPLE III

The procedure of the preceding examples was followed, with the metal chelate being titanium triethanolamine, purchased commercially from E. I. du Pont de Nemours and Company under the trade designation "TAT." The metal chelate was applied as a 1 percent by weight aqueous solution at room temperature. The hydroxylated aluminum plate remained immersed in the titanium triethanolamine solution for approximately 3 minutes, after which it was dried and washed with tap water at a temperature of about 80° C. to hydrolyze the chelate ester and provide the hydrophilic sublayer.

After hydrolysis, the plate was sensitized, exposed to light, and developed as in the preceding examples. The plate was thereafter press tested, and impressions of satisfactory quality were obtained.

Lithographic printing surfaces produced in accordance with the present invention thus have a novel adherent barrier coating which seals the surface of the base member and precludes contact between the support and the subsequently applied light-sensitive coating. The barrier layer is also, of course, hydrophilic and oleophobic so as to be scum preventing and to reduce tone in the resulting printing plate. As shown by the working examples, plates which combine this barrier layer and the subsequently applied light-sensitive coating are capable of being used to make impressions of very acceptable quality without failure of the image areas.

Other modes of applying the principle of the invention may be employed, change being made as regards the details described, provided the features stated in any of the following claims, or the equivalent of such, be employed.

We therefore particularly point out and distinctly claim as our invention:

1. A plate for use in lithographic printing consisting of a support member having a hydroxylated surface and a hydrophilic barrier coating on said support comprising the reaction product of said hydroxylated surface and a metal chelate ester of a Group IV*b* metal and an alcoholic compound selected from the group consisting of glycols and alkanol amines.

2. The plate of claim 1 in which said alcoholic compound is octylene glycol.

3. The plate of claim 1 in which said alcoholic compound is triethanolamine.

4. The plate of claim 1 in which the surface of said support is aluminum.

5. The plate of claim 1 in which said Group IV*b* metal is selected from the group consisting of zirconium and titanium.

6. The plate of claim 1 in which the surface of said support has a coating of hydroxyl containing water dispersible amino formaldehyde resin thereon to form said hydroxylated surface.

7. A lithographic plate comprising a support member having a hydroxylated surface, a hydrophilic barrier coating on said support comprising the reaction product of said hydroxylated surface and a metal chelate ester of a Group IV*b* metal and an alcoholic compound selected from the group consisting of glycols and alkanol amines, and a light-sensitive coating over said hydrophilic barrier coating.

8. The plate of claim 7 in which said alcoholic compound is octylene glycol.

9. The plate of claim 7 in which said alcoholic compound is triethanol amine.

10. The plate of claim 7 in which the surface of said support has a coating of a hydroxyl containing water dispersible amino formaldehyde resin thereon to form said hydroxplated surface.

11. A process of forming a sublayer on a lithographic plate base comprising applying a coating of a metal chelate ester of a Group IV*b* metal and an alcoholic compound selected from the group consisting of glycols and alkanol amines to a hydroxylated surface of a support member, and hydrolyzing such metal chelate ester on said support to react such ester with such hydroxylated surface to form a hydrophilic barrier coating thereon.

12. The process of claim 11 in which the metal chelate ester is applied from a solution having a concentration of apporximately 0.1 to about 10.0 weight percent of metal chelate.

13. The process of claim 11 in which said support is dried after application of said metal chelate ester and prior to said hydrolysis.

14. The process of claim 11 in which said plate is subsequently rinsed with water and dried.

15. A process of forming a lithographic plate comprising applying a metal chelate ester of a Group IV*b* metal and alcoholic compound selected from the group consisting of glycols and alkanol amines to a hydroxylated surface support, hydrolyzing such metal chelate on said support to react such chelate ester with such hydroxylated surface to form a permanently hydrophilic coating on said support, and subsequently applying a coating of a light-sensitive material to such hydrophilic barrier coating.

References Cited

UNITED STATES PATENTS

| | | | |
|---|---|---|---|
| 2,950,174 | 8/1960 | Lagally | 96—33X |
| 3,061,483 | 10/1962 | Coles et al. | 148—6.14 |
| 3,136,639 | 6/1964 | Deal et al. | 96—33X |
| 3,169,065 | 2/1965 | Sorkin et al. | 96—33 |
| 3,231,376 | 1/1966 | Sorkin et al. | 96—33 |

DONALD LEVY, Primary Examiner

R. E. MARTIN, Assistant Examiner

U.S. Cl. X.R.

96—33, 86; 101—453, 457, 459; 117—34; 148—6.14, 6.27